No. 642,333. Patented Jan. 30, 1900.
T. B. JEFFERY.
DRESS GUARD.
(Application filed Jan. 7, 1898.)

(No Model.)

Witnesses:
Frank S. Blanchard

Inventor:
Thomas B. Jeffery
By Attorney

UNITED STATES PATENT OFFICE.

THOMAS B. JEFFERY, OF CHICAGO, ILLINOIS.

DRESS-GUARD.

SPECIFICATION forming part of Letters Patent No. 642,333, dated January 30, 1900.

Application filed January 7, 1898. Serial No. 665,892. (No model.)

*To all whom it may concern:*

Be it known that I, THOMAS B. JEFFERY, a citizen of the United States, residing at Chicago, county of Cook, State of Illinois, have invented a certain new and useful Improvement in Dress-Guards; and I declare the following to be a full, clear, and exact description of the invention, such as will enable others skilled in the art to which it pertains to make and use the same, reference being had to the accompanying drawings, which form a part of this specification.

My invention has for its object the production of a dress-guard for use more particularly on ladies' wheels which shall be simple, easily constructed, and effective in serving its purpose.

It consists in a combination of devices and appliances hereinafter described and claimed.

Figure 1:
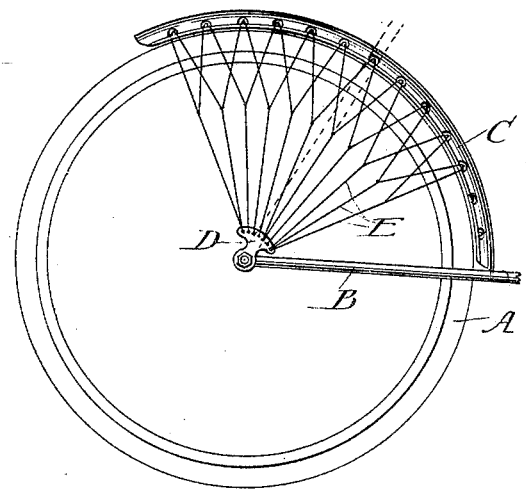
Figure 2:
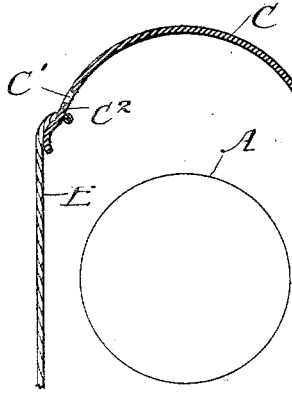
Figure 3:
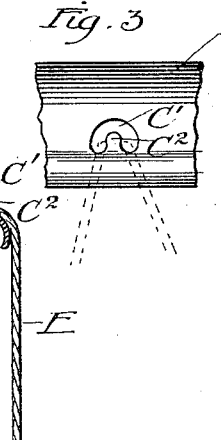
Figure 4:
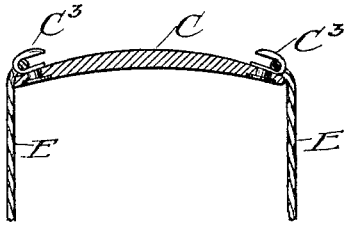

In the drawings, Figure 1 is a side elevation of the guard. Fig. 2 is a cross-section. Fig. 3 is a side elevation of a portion with the parts enlarged. Fig. 4 is a cross-section illustrating a slight variation.

In carrying out the invention, A represents the tire of the wheel, B the frame portion extending horizontally from the axle of the rear wheel, and C the plate forming the guard. This guard-plate C may be made of any desired material.

D is the usual plate at the axle for engaging the lower ends of the lacing-strings E.

My invention relates particularly to the means on the guard-plate C to which the upper ends of the lacing-strings E are engaged.

In Figs. 1, 2, and 3 I have shown the plate made of metal, and I have provided each edge of the plate C with a series of openings $C'$ and a projection $C^2$. By this construction the string E, instead of being passed from one side to the other through an eye or orifice in the edge of the plate, is looped over the projection $C^2$, so that both strands of the lacing pass over the convex side instead of up on one side and down on the other, as heretofore. By this construction for a given width of plate the lacing-strings are kept farther away from the tire than was the case with the old form of construction.

In Fig. 4 I have shown the plate C made of wood and provided with metal hooks $C^3$, over which the lacing-strands are passed.

By the above-described construction in addition to the function of keeping the strings away from the tire there is the additional advantage that the lacing is easily detached at any time.

If desired, the plate D may also be provided with the projections $C^2$ or the hooks $C^3$ or their equivalent.

What I claim is—

1. In a bicycle the combination with the guard-lacing of a guard-plate extending longitudinally over the wheel and curved to conform to the shape thereof, said plate provided with projections, and the lacing passed first over the outer edge of the plate around the projection and back over the outer edge, whereby a maximum space is left for the tire between the strands of lacing on the opposite edges of the plate, substantially as described.

2. A metal guard-plate for a bicycle provided along each edge with a series of orifices and a projection extending into each orifice but substantially flush with the face of the plate, substantially as described.

In testimony whereof I sign this specification in the presence of two witnesses.

THOMAS B. JEFFERY.

Witnesses:
CHARLES T. JEFFERY,
O. B. JONES.